United States Patent Office.

JOSEPH A. BRADBURN, OF NORTHWICH, COUNTY OF CHESTER, ENGLAND.

PROCESS OF MANUFACTURING CAUSTIC SODA.

SPECIFICATION forming part of Letters Patent No. 402,226, dated April 30, 1889.

Application filed July 24, 1888. Serial No. 280,923. (No specimens.)

*To all whom it may concern:*

Be it known that I, JOSEPH A. BRADBURN, of Northwich, county of Chester, England, a citizen of Great Britain, have invented certain new and useful Improvements in the Process of Manufacturing Caustic Soda or Caustic Potash, of which the following is a specification.

This invention relates to the processes for the manufacture of caustic soda or caustic potash and bleaching-powder in which common salt or potassium chloride is used as a base for the several chemical reactions.

The object of this invention is to simplify the process and reduce the cost of production.

It consists in the several novel features hereinafter set forth, and which are specifically set forth in the claim hereunto annexed.

The first step of the process consists in the treatment of sodium chloride or potassium chloride in a still of stone or stoneware with nitric acid and peroxide of manganese hydrated or not, or a manganite, manganate, or permanganate of soda for the treatment of sodium chloride, or of potash if potassium chloride is treated, and during such treatment heated either by free steam, or by steam-pipes running through the still. These steam-pipes may be of stoneware or of iron enameled on the outside. If to two molecules of common salt one of peroxide of manganese is added together with four molecules of nitric acid, the chemical reaction with heat produces two molecules of nitrate of soda in conjunction with one molecule of nitrate of manganese, one molecule of chlorine, and two molecules of water. The chemical symbols representing this reaction, when peroxide of manganese is used, can be stated, as follows: $2NaCl + MnO_2 + 4HNO_3 = 2NaNO_3 + Mn(NO_3)_2 + Cl_2 + 2H_2O$.

The chlorine is used in the ordinary way for the manufacture of bleaching-powder. This produces a spent liquor in the still containing nitrate of soda and nitrate of manganese, and the next step or steps of the process are for the purpose of producing from this liquor a concentrated solution of nitrate of soda.

As the the second step of this process caustic soda is added to precipitate the manganese, which is also oxidized by blowing air through the mixture. The mixture is then settled, decanted, or filtered to remove the peroxide of manganese, ($MnO_2$,) which leaves a concentrated solution of nitrate of soda ($NaNO_3$.) The nitrate of soda is obtained by evaporation and mixed with two or three times its weight of ferric oxide ($Fe_2O_3$,) and this mixture is heated in a suitable furnace in a current of air passing through the furnace, and the nitrous fumes which are evolved mix with the air and are together passed over any of the oxidizing substances mentioned above—namely, peroxide of manganese in any form or a manganite, manganate, or permanganate of an alkali or alkaline earth whether heated or not. To save the nitric acid present in this oxidized air-current, it is passed into a suitable receptacle and treated with water or steam and the nitric acid is condensed. The mass remaining in the furnace is then removed and lixiviated, which yields a strong caustic-soda liquid and ferric oxide to be used over again. If potassium chloride has been used in the first place, then a caustic-potash liquor and ferric oxide are obtained here.

What I claim as my invention, and desire to secure by Letters Patent, is—.

The process for the manufacture of caustic soda or caustic potash and bleaching-powder, consisting of the following steps, to wit: first, the treatment with nitric acid and peroxide of manganese of common salt or of potassium chloride in a still; second, the treatment of spent liquor with caustic soda or caustic potash and the removal of the peroxide of manganese or its chemical equivalent; third, the evaporation of the nitrate of soda or nitrate of potash mixing it with ferric oxide and furnacing, and, fourth, lixiviating the mass from the furnace.

In witness whereof I have hereunto set my hand this 19th day of July, 1888.

JOSEPH A. BRADBURN.

In presence of—
C. W. SMITH,
H. P. DENISON.